(12) United States Patent 
Huo

(10) Patent No.: US 12,664,000 B2 
(45) Date of Patent: Jun. 23, 2026

(54) DYNAMICALLY UPDATING A BOOT REGION TABLE TO INCREASE READ SPEED DURING BOOT UP

(71) Applicant: Micron Technology, Inc., Boise, ID (US)

(72) Inventor: Binbin Huo, Sauerlach (DE)

(73) Assignee: MICRON TECHNOLOGY, INC., Boise, ID (US)

( * ) Notice: Subject to any disclaimer, the term of this patent is extended or adjusted under 35 U.S.C. 154(b) by 188 days.

(21) Appl. No.: 18/439,387

(22) Filed: Feb. 12, 2024

(65) Prior Publication Data

US 2024/0281259 A1 Aug. 22, 2024

Related U.S. Application Data

(60) Provisional application No. 63/486,157, filed on Feb. 21, 2023.

(51) Int. Cl.
 *G06F 9/4401* (2018.01)
(52) U.S. Cl.
 CPC .................................. *G06F 9/4408* (2013.01)
(58) Field of Classification Search
 CPC ........... G06F 9/4408; G06F 2212/7201; G06F 12/063; G06F 16/84
 See application file for complete search history.

(56) References Cited

U.S. PATENT DOCUMENTS

| | | | |
|---|---|---|---|
| 2005/0240830 A1* | 10/2005 | Kubo | G06F 11/0724 714/45 |
| 2015/0058535 A1* | 2/2015 | Lasser | G11C 16/3495 711/103 |
| 2018/0018182 A1* | 1/2018 | Makuni | G06F 3/0634 |
| 2019/0155723 A1* | 5/2019 | Park | G06F 12/0862 |
| 2020/0097188 A1* | 3/2020 | Gunda | G06F 12/1009 |
| 2022/0050606 A1* | 2/2022 | Chen | G06F 3/061 |

* cited by examiner

*Primary Examiner* — Hyun Soo Kim 
(74) *Attorney, Agent, or Firm* — NICHOLSON DE VOS WEBSTER & ELLIOTT LLP

(57) ABSTRACT

A method includes receiving a first read request during a first boot time. The first read request includes a logical block address and a length. The method also includes tracing the first read request. The method further includes creating a table using the traced first read request. The table includes a sequential record of each traced read request received during the first boot time. The method further includes transmitting the table to a host system during a second boot time. The method further includes receiving a second read request during the second boot time. The second read request includes a logical to physical representation obtained using the table and the logical block address.

20 Claims, 7 Drawing Sheets

100

HOST SYSTEM
120

MEMORY SUBSYSTEM 110

MEMORY SUBSYSTEM CONTROLLER 115

PROCESSOR 117

LOCAL MEMORY
119

MAPPING
MANAGER

113

MEMORY
DEVICE
140

MEMORY
DEVICE
130

LOCAL MEDIA
CONTROLLER
135

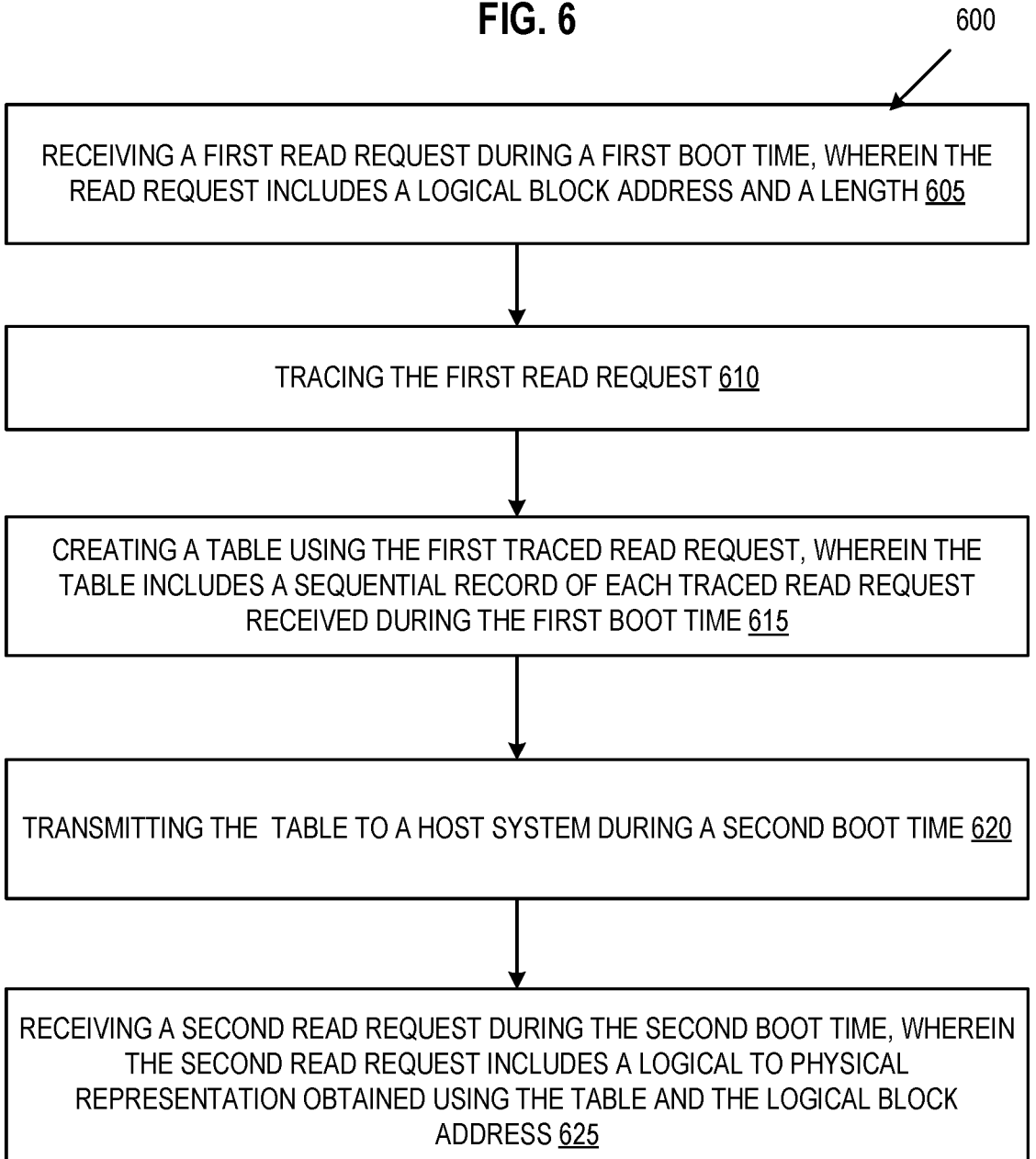

RECEIVING A FIRST READ REQUEST DURING A FIRST BOOT TIME, WHEREIN THE READ REQUEST INCLUDES A LOGICAL BLOCK ADDRESS AND A LENGTH 605

TRACING THE FIRST READ REQUEST 610

CREATING A TABLE USING THE FIRST TRACED READ REQUEST, WHEREIN THE TABLE INCLUDES A SEQUENTIAL RECORD OF EACH TRACED READ REQUEST RECEIVED DURING THE FIRST BOOT TIME 615

TRANSMITTING THE TABLE TO A HOST SYSTEM DURING A SECOND BOOT TIME 620

RECEIVING A SECOND READ REQUEST DURING THE SECOND BOOT TIME, WHEREIN THE SECOND READ REQUEST INCLUDES A LOGICAL TO PHYSICAL REPRESENTATION OBTAINED USING THE TABLE AND THE LOGICAL BLOCK ADDRESS 625

DYNAMICALLY UPDATING A BOOT REGION TABLE TO INCREASE READ SPEED DURING BOOT UP

CROSS-REFERENCE TO RELATED APPLICATION

The present application claims the benefit of U.S. Provisional Patent Application No. 63/486,157 filed on Feb. 21, 2023, which is incorporated by reference herein in its entirety.

TECHNICAL FIELD

The present disclosure generally relates to a boot region table, and more specifically, relates to dynamically updating the boot region table to improve read speed during a boot up process.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is a flow diagram of another example method to improve read speed during a boot up process using a dynamic boot region table, in accordance with some embodiments of the present disclosure.

DETAILED DESCRIPTION

Figure 1:
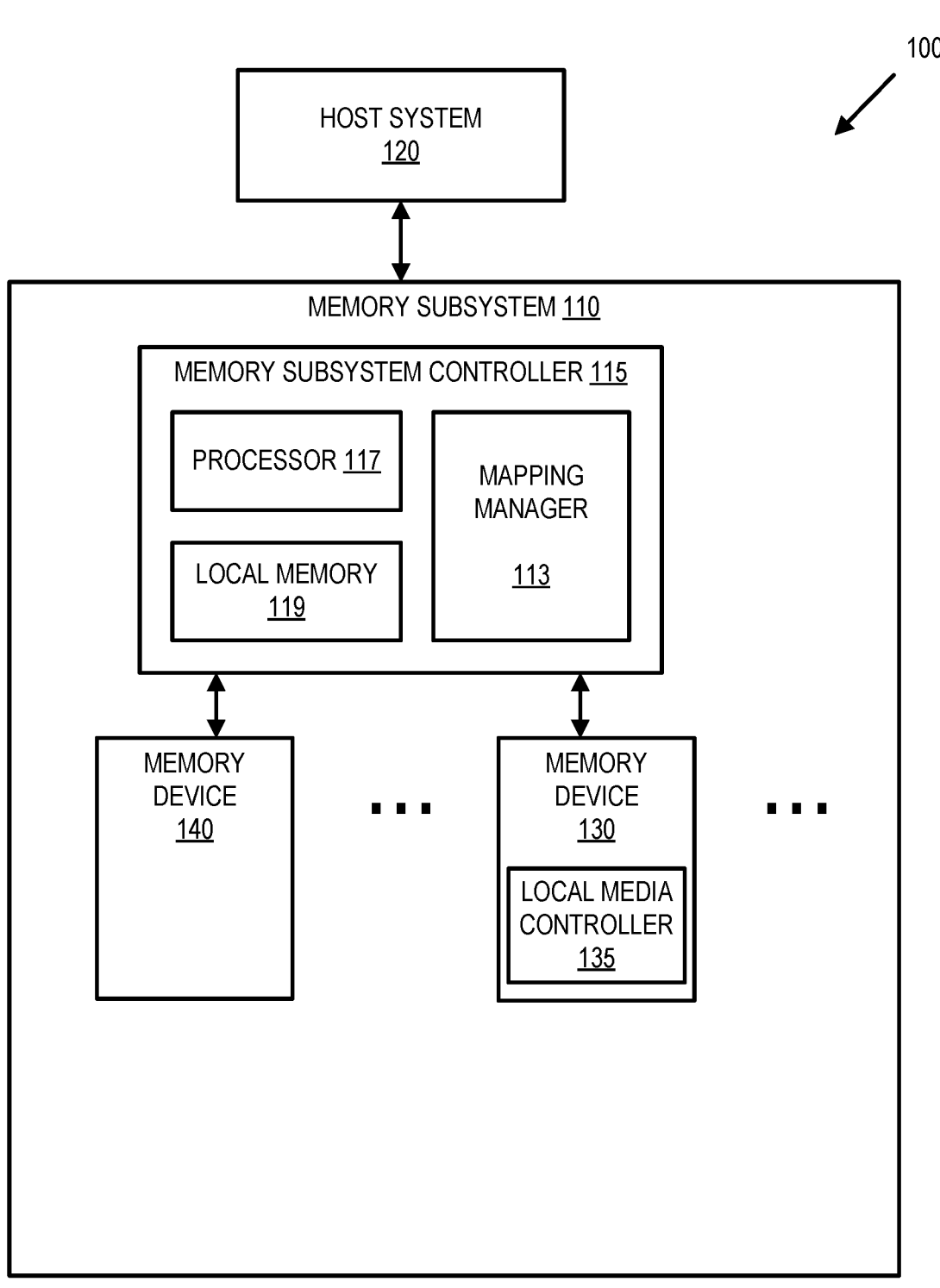
FIG. 1 illustrates an example computing system that includes a memory subsystem in accordance with some embodiments of the present disclosure.

Aspects of the present disclosure are directed to improving boot up performance using a dynamically updated boot region table. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

A typical boot up process performed by a host system involves reading system information from non-volatile memory locations including bootloader data (e.g., bootROM code), kernel data, filesystem data, library application data, and the like. Such system information is then written into random-access memory (RAM) locations for use by the host system during normal host system operations.

To reduce the time it takes to load the system information into RAM, some conventional host systems maintain a list of logical block addresses (LBAs) that are read during the boot up. For example, the maintained LBA list (or LBA table) can be used to preload/pre-read data from non-volatile memory into an internal cache before the host system performs a read operation. However, the list of LBAs corresponding to each read operation during the boot phase can be quite large. As a result of system resource limitations, portions of the LBA list must be loaded multiple times.

Other conventional systems attempt to reduce the time it takes to load the system information into RAM by preconfiguring and storing ranges of LBAs to be read during boot up. Such ranges of LBAs are considered a single region (or sub-region) of addresses read during a read operation. Some regions, such as ranges of logical block addresses directed to rarely updated address spaces, are cached by the host system. In a specific example, if the host system is operating in a host performance booster (HPB) mode, these cached regions are considered "pinned regions." In HPB, pinned regions are preconfigured using parameters such as a pinned region start and a number of pinned regions. However, preconfiguring the pinned regions assumes that the read operations will be read by the host system sequentially, according to a sequence of regions of the pinned regions. Moreover, the host system is assumed to read data in the regions according to the preconfigured size of each region. In practice, the host system reads data of variable lengths and in a semi-random order. As a result, the pinned regions are read in random order (e.g., random reads) during an actual boot up process.

Aspects of the present disclosure address the above and other deficiencies by dynamically updating a boot region table recording a sequence of received read request. The boot region table captures a sequence number of each received read request during boot up, a region of memory to be read, and a read length. A mapping manager of a memory subsystem traces the read operations requested by the host system during a boot process to capture each read request received by the mapping manager during the boot process. Subsequently, the mapping manager creates and maintains a boot region table including records of the traced read operations received during boot time. The mapping manager improves the read time during boot up by preloading data (or physical addresses) according to the predicted sequence of the boot region table such that the read operations performed during bootup appear sequential, even if the addresses being read are non-contiguous.

FIG. 1 illustrates an example computing system 100 that includes a memory subsystem 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a mapping manager 113 that can create a dynamic table capturing a sequence of read requests performed during boot phase. In addition, the mapping manager 113 preloads physical addresses (or data) corresponding to the regions/subregions of the captured sequence of read requests. In some embodiments, the controller 115 includes at least a portion of the mapping manager 113. For example, the controller 115 can include a processor 117 (processing device) configured to execute instructions stored in local memory 119 for performing the operations described herein. In some embodiments, a mapping manager 113 is part of the host system 120, an application, or an operating system.

The mapping manager 113 creates the dynamic table of read requests by tracing each read requests received during a boot phase. By tracing the read requests, the mapping manager 113 identifies a sequence of read requests received during the boot phase including the logical block addresses (or regions/subregions), and a read length identified in the read request. If the received read request includes one or more logical block addresses associated with a region or subregion, then the mapping manager 113 can aggregate or otherwise map the logical block addresses to the region (or subregion). The mapping manager 113 obtains a logical to physical representation corresponding to the region/subregion of the traced read request. The logical to physical representation is any mapping that maps a logical block address to a physical address such as a logical to physical mapping entry. Specifically, the logical to physical representation may be a mapping that maps ranges of logical block addresses of a region to ranges of physical block addresses of the region. As used herein, a region is a range of logical block addresses. Regions may be preconfigured such that the host system 120 and the memory subsystem 110 agree on the range of logical block addresses of a particular region. In an example, a region includes twelve contiguous logical block addresses. The region includes four subregions, each subregion including three contiguous logical block addresses of the twelve logical block addresses in the region. The present disclosure is described in terms of regions, but it should be appreciated that one or more subregions/logical block addresses can be traced by the mapping manager 113 and stored in a table.

The mapping manager 113 maintains a table storing a record of a sequence of each received read request during bootup including a region indicating data to be read, and a read length. The mapping manager 113 provides the table to the host system 120 during a subsequent boot phase such that the mapping manager 113 can preload data (or physical addresses) according to the traced/predicted sequence of read requests. By predicting a sequence of read requests and a read length, and previously determining the logical to physical mapping corresponding to the read request, the mapping manager 113 improves read speed during the boot phase by making random (or semi-random) read requests seem sequential. Further details with regards to the operations of the mapping manager 113 are described below.

Figure 2:
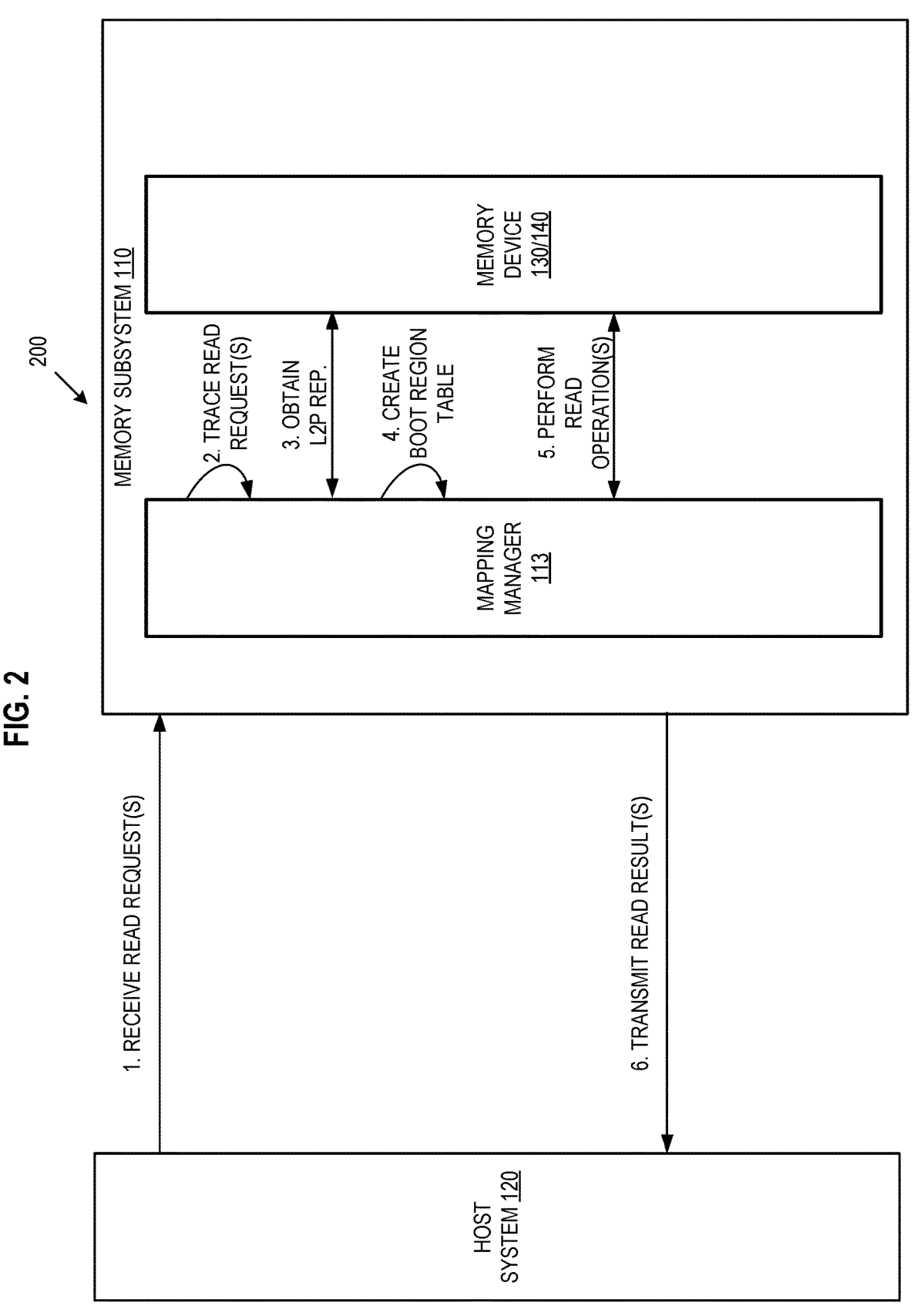
FIG. 2 is a diagram of an example sequence used to create a boot region table during an initial boot up process, in accordance with some embodiments of the present disclosure.

FIG. 2 is a diagram of an example sequence 200 used to create a boot region table during an initial boot up process, in accordance with some embodiments of the present disclosure. The sequence 200 takes place during an initial boot phase. The sequence is shown between a memory subsystem 110 (including a mapping manager 113 and memory device 130 of FIG. 1) and a host system 120. In other illustrative sequences, the memory subsystem 110 may communicate with multiple host systems. In these sequences, the processes and communications performed by the memory subsystem 110 may be performed in parallel and one or more operations can occur in a sequence that differs from the numerical order of the illustrated example.

At a time indicated by numeral 1, the memory subsystem 110 receives one or more read requests transmitted by the host system 120. For example, the host system 120 can transmit a read request that identifies data to be read from a portion of the memory device 130 of the memory subsystem 110. In some embodiments, the read request may indicate one or more logical block addresses directing the memory subsystem 110 to one or more locations/addresses of memory that contain data to be read. If the received read request includes one or more logical block addresses associated with a region or subregion, then the mapping manager 113 can aggregate or otherwise map the logical block addresses to the region (or subregion). The read request may also indicate a read length, or a size of the data to be read.

At a time indicated by numeral 2, the mapping manager 113 traces the received read request(s). Tracing the read request(s) includes capturing the order of received read request(s) by assigning a sequence number to the received read requests. In some embodiments, tracing can also include identifying logical block address(es) (or regions mapped from the logical block address(es) from the read request and/or identifying lengths of data to be read. For example, the mapping manager 113 extracts the logical block address(es) and read length from the read request. In some embodiments, the mapping manager 113 assigns a sequence number to the logical block address(es) extracted from the read request.

At a time indicated by numeral 3, the mapping manager 113 obtains a logical to physical representation from memory device 130/140. The logical to physical representation maps one or more regions determined from the received read requests to one or more physical addresses corresponding to each logical block address of one or more regions. In some embodiments, the logical to physical representation is a logical to physical mapping entry. Such logical to physical mapping may be performed by any suitable mechanism or may be preconfigured. In some embodiments, the physical addresses may be encoded.

In a non-limiting example, the mapping manager 113 obtains a logical to physical representation by first checking a lower latency volatile memory of the memory subsystem 110 (such as memory device 140 of FIG. 1) for a logical to physical (L2P) table or similar data structure storing a mapping between physical addresses and corresponding logical addresses. Because the lower latency volatile memory is limited in its capacity and only stores a portion of the L2P mappings for the memory subsystem 110, the mapping manager 113 may have to perform additional memory operations using higher latency but abundant non-volatile memory (e.g., memory device 130) to obtain the logical to physical representation.

When the lower latency volatile memory (such as memory device 140) does not include the logical to physical mapping, the mapping manager 113 requests a logical to physical representation from memory device 130. For example, the mapping manager 113 reads from the L2P table a physical address corresponding to the logical address received as part of the read request at numeral 1. As described with reference to FIG. 1, the memory device 130 may be a higher latency but abundant non-volatile memory that stores a full L2P table of mapped logical addresses and physical addresses.

At a time indicated by numeral 4, the mapping manager 113 creates a boot region/table. The boot region table is a sequential record of read requests during a boot phase including one or more regions/subregions corresponding to logical block address(es) of the read request, and the read length. In some embodiments, the boot region table includes other information such as the logical to physical representation (e.g., obtained physical address mapped to each logical block address of the region). It should be appreciated that the boot region table may also map subregions and/or logical block addresses received during a boot process to corresponding physical addresses (e.g., a logical to physical representation). Each entry in the boot region table is a record tracking the sequence of read requests during the boot phase. While a boot-specific table corresponding to the boot process performed by the host system 120 is described, it should be appreciated that other tables corresponding to other host system 120 processes may be determined by the mapping manager 113.

At a time indicated by numeral 5, the mapping manager 113 and memory device 130/140 perform one or more read operation(s), obtaining data requested by the host system 120. For example, the mapping manager 113 uses the logical to physical representation to read data in a range of physical addresses mapped to the region (e.g., range of logical address) received as part of the read request. The mapping manager 113 sends a read request to memory device 130 for data stored at the physical addresses. As shown, to perform the read operation(s) at numeral 5, at least two read operations are required. For example, the mapping manager 113 obtains logical to physical representation at numeral 3 by reading data in memory device 130/140, and subsequently uses the obtained logical to physical representation to read data at numeral 5.

At a time indicated by numeral 6, the memory subsystem 110 transmits the data (e.g., the read result) to the host system 120. During the boot up process the memory subsystem 110 may receive multiple read requests and perform the steps described at numerals 2-5 for each received read request.

Figure 3:
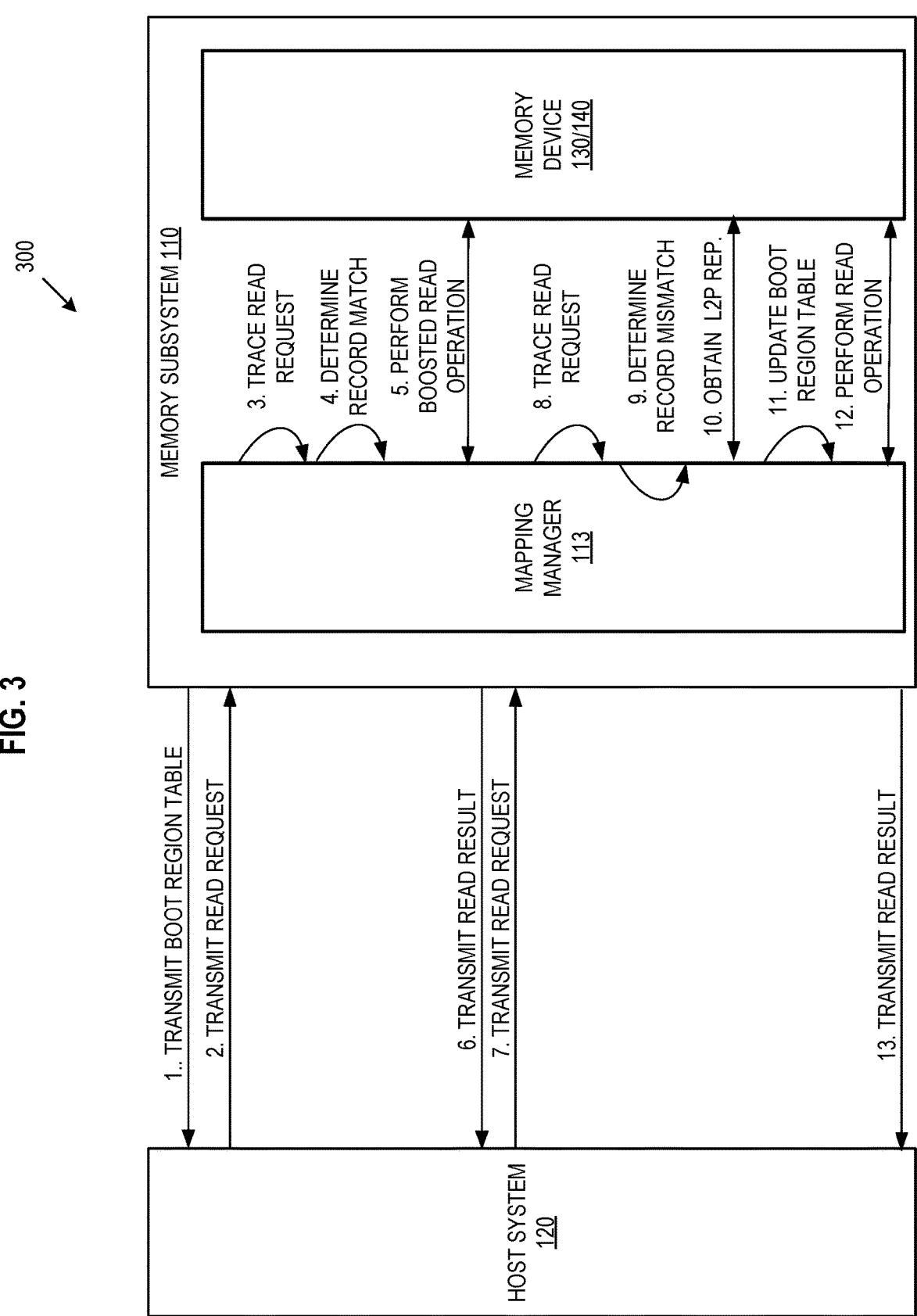
FIG. 3 is a diagram of an example sequence used during subsequent boot up processes, in accordance with some embodiments of the present disclosure.

FIG. 3 is a diagram of an example sequence 300 used during a subsequent boot up processes, in accordance with some embodiments of the present disclosure. The sequence 300 takes place during a subsequent boot phase. The sequence is shown between a memory subsystem 110 (including a mapping manager 113 and memory device 130 of FIG. 1) and a host system 120. In other illustrative sequences, the memory subsystem 110 may communicate with multiple host systems. In these sequences, the processes and communications performed by the memory subsystem 110 may be performed in parallel and one or more operations can occur in a sequence that differs from the numerical order of the illustrated example.

At a time indicated by numeral 1, the memory subsystem 110 transmits the boot region table to the host system 120. In some embodiments, the mapping manager 113 automatically uploads the boot region table to the host system 120 at the beginning of the host system 120 boot phase. In other embodiments, the host system 120 probes or otherwise detects that the mapping manager 113 has created the boot region table. In yet other embodiments, the mapping manager 113 communicates with the host system 120, indicating that the mapping manager 113 has created the boot region table. Subsequently, the mapping manager 113 transmits the boot region table to the host system 120.

At a time indicated by numeral 2, the memory subsystem 110 receives one or more read request(s) transmitted by the host system 120. Because the host system 120 has received the boot region table at numeral 1, the read request may include a logical to physical representation (e.g., a L2P entry). In a non-limiting example, the host system 120 uses the boot region table received at numeral 1 to fetch L2P entries according to a start LBA and a read length. As a result, the transmitted read request at numeral 2 includes the fetched L2P entries, the read length, and the starting LBA. As described herein, in some embodiments, the read request includes a region and/or subregion mapped to the LBA.

In some embodiments, the read request includes multiple L2P entries. For example, a single L2P entry (e.g., logical to physical representation obtained by the host system 120 using the boot region table) may span 8KB. However, the read request may request a read of size 64KB. As a result, the read command transmitted to the memory subsystem 110 includes 64KB/8KB=8 L2P entries.

At a time indicated by numeral 3, the mapping manager 113 traces the read request. As described herein, tracing the read request includes assigning a sequence number to the received read requests.

At a time indicated at numeral 4, the mapping manager 113 determines if there is a record match for the read request using the boot region table. For example, the mapping manager 113 may compare a region mapped using the received starting LBA of the read request to stored regions of read requests in the boot region table. When the mapping manager 113 matches the regions, the mapping manager 113 compares other information of the received read request to stored information in the boot region table. For example, the mapping manager 113 can compare the sequence number of the received read request to the sequence number of the matched stored read request in the boot region table (described herein as the corresponding stored read request). If the assigned sequence number of the received read request matches the assigned sequence number of the corresponding stored read request, then the mapping manager 113 determines there is a record match. In some embodiments, the mapping manager 113 determines a record match responsive to performing a threshold number of checks. For example, the mapping manager 113 determines the record match responsive to checking, and matching, both the sequence number of the received read request and the sequence number of the corresponding stored read request in the boot table, and the read length of the received read request and the read length of the corresponding stored read request in the boot table.

At a time indicated by numeral 5, the mapping manager 113 performs a boosted read operation. As described herein, a boosted read is a read benefitting from preloaded logical to physical information. For example, using the traced/predicted sequence of regions during boot phase, the traced/predicted read length, and, in some embodiments, the logical to physical representation previously obtained during a prior boot phase, the mapping manager 113 preloads logical to physical information and/or data. For example, the mapping manager 113 may preload a physical block address corresponding to the logical to physical representation received in the read request. As a result, the mapping manager 113 does not have to query a cached L2P table stored in volatile memory and/or a full L2P table stored in non-volatile memory of the memory device 130/140. In this manner, read speed is improved.

Additionally or alternatively, the mapping manager 113 may preload data at physical addresses corresponding to the one or more regions determined from the read request. Because the preloaded data is arranged in the predicted sequence of regions, the mapping manager 113 is able to read regions as if the read is a sequential read. That is, although the regions requested to be read may be non-contiguous, the preloaded sequence of non-contiguous data simulates a read speed similar to a sequential read. In this manner, read speed is improved.

At a time indicated by numeral 6, the memory subsystem 110 transmits the data (e.g., the read result) to the host system 120.

At a time indicated by numeral 7, the memory subsystem 110 receives one or more read request(s) transmitted by the host system 120. Such read requests may be considered "current" read requests. While the boot region table was transmitted to the host system 120 at numeral 1, there may still be situations in which one or more read requests do not include logical to physical representations. For example, at a time after the prior boot phase and before the subsequent boot phase, the host system 120 may download a new application that impacts the boot phase. As a result of the new application data, some read requests may not include logical to physical representations. That is, the read requests include a starting LBA mapped to a region and/or a read length that is not included in the boot region table.

At a time indicated by numeral 8, the mapping manager 113 traces the read request, assigning a sequence number to the received read request (i.e., relative to the other read requests, such as the request received at a time indicated by numeral 2).

At a time indicated by numeral 9, the mapping manager 113 determines a record mismatch using the boot region table. The mapping manager 113 determines the record mismatch by comparing information in the current read request to corresponding information stored in the boot region table. For example, the mapping manager 113 may compare a logical block address received in the current read request to logical block addresses of stored regions in the boot region table. If the mapping manager 113 can't map the current logical block address (or region/subregion) to stored regions in the boot region table, then the mapping manager 113 determines there is a record mismatch. That is, the logical block address of the current read request does not map to a region stored in the boot region table. Additionally or alternatively, the sequence number of the current read request may not match the sequence number of the corresponding stored read request in the boot region table, the read length of the read request may not match the read length of the corresponding stored read request in the boot region table, and the like.

In a first non-limiting example, the region determined from the read request received at numeral 7 may be included in the boot region table, but the sequence number assigned to the current read request may be a different sequence number for that region in the boot region table. In a second non-limiting example, the region determined from the read request received at numeral 7 may be included in the boot region table, but the read length of the current read request may be different from the read length for that region in the boot region table.

At a time indicated by numeral 10, the mapping manager 113 obtains logical to physical representations from memory device 130/140 to illustrate an example when the region of the current read request is not stored in the boot region table. As described with reference to numeral 3 in FIG. 2., a logical to physical representation maps physical addresses corresponding to each logical block address of one or more regions.

At a time indicated by numeral 11, the mapping manager 113 updates the boot region table. As described herein, updating the boot region table includes updating a sequence number of a read request corresponding to a stored read request in the boot region table, adding a region to the table in a new record, removing a region from the table, and/or otherwise updating an entry in the boot region table (e.g., replacing a read length).

At a time indicated by numeral 12, the mapping manager 113 and memory device 130/140 perform a read operation, obtaining data requested by the host system 120. For example, the mapping manager 113 uses the logical to physical representation to determine physical addresses corresponding to the region received as part of the read request. The mapping manager 113 then sends read request(s) to memory device 130 for data stored at the physical addresses.

As shown, to perform the read operation at numeral 12, at least two operations are required. For example, the mapping manager 113 obtains a physical address by obtaining the logical to physical representation at numeral 10, and subsequently uses the obtained physical address to read data at numeral 12. In contrast, the boosted read operation at numeral 5 required fewer memory operations as the mapping manager 113 did not have to obtain a logical to physical representation.

At a time indicated by numeral 13, the memory subsystem 110 transmits the read data (e.g., the read result) to the host system 120.

Figure 4:
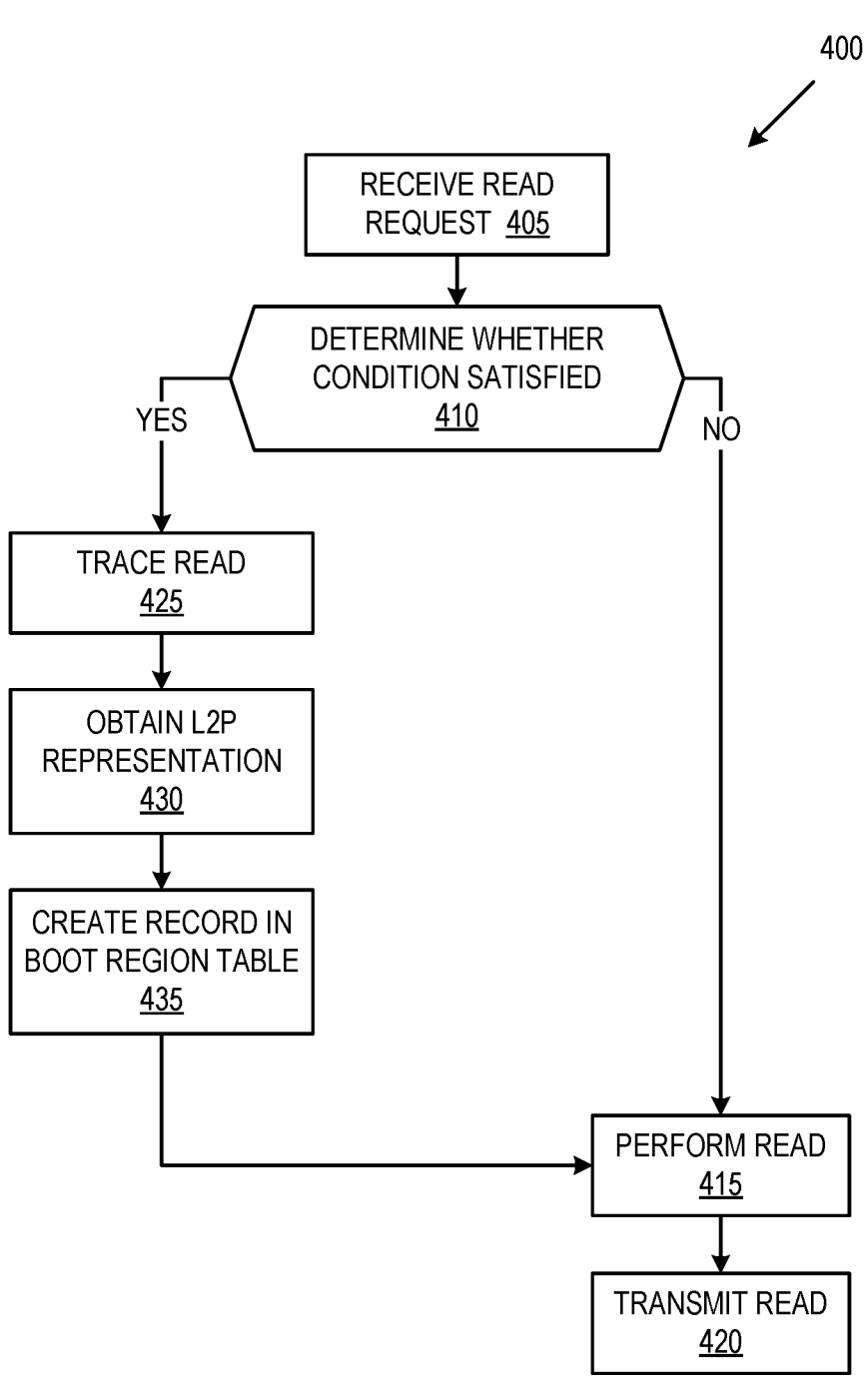
FIG. 4 is a flow diagram of an example method to dynamically create a boot region table, in accordance with some embodiments of the present disclosure.

FIG. 4 is a flow diagram of an example method 400 to dynamically create a boot region table, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the mapping manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives a read request. In some embodiments, the read request may indicate one or more logical block addresses directing the processing device to one or more locations/addresses of memory that contain the data to be read. If the received read request includes logical block addresses associated with a region or subregion, then the mapping manager 113 can map the logical block addresses to the region (or subregion). The read request may also indicate a read length, or a size of the data to be read.

At operation 410, the processing device determines whether a condition is satisfied. In some embodiments, the condition is a condition corresponding to a host system 120 boot process. The host system 120 boot process includes the time it takes for a host system 120 to power on, to the time it takes for the host system 120 to finish loading the data needed for a full boot. In some embodiments, the data needed for a full boot includes bootloader data, kernel data, filesystem data, library application data, and the like.

In a first non-limiting example, the condition corresponding to the host system 120 boot process includes setting a flag. For example, the processing device determines whether one or more status flags are set. Setting one or more status flags may be representative of an ongoing boot process of the host system 120. Accordingly, setting one or more flags corresponds to a satisfied condition. If the processing device determines that one or more status flags are set, then the processing device determines that the condition is satisfied (e.g., the host system 120 is performing a boot process).

In a second non-limiting example, the condition corresponding to the host system 120 boot process includes a timer. For example, the processing device determines whether a timer is active. If the time is active, then the condition is satisfied and the host system 120 is performing a boot process. If the timer is not active (e.g., inactive or expired), then the condition is not satisfied and the host system 120 is not performing a boot process. In some implementations, the duration of the timer is a user-configured parameter. In other implementations, the duration of the timer is configured by the host system 120 and communicated to the processing device. In yet other implementations, the processing device configures the duration of the timer.

In a third non-limiting example, the condition corresponding to the host system 120 boot process includes data that has been read. For example, the processing device monitors the size of data that has been read by summing the size of data read in each read request. If the total amount of data read does not satisfy a threshold (e.g., three gigabyte threshold), then the condition is satisfied as the total amount of data read during the boot process has not been satisfied. As such, the processing device determines that the host system 120 is performing the boot process. If the total amount of data read does satisfy the threshold, then the condition is not satisfied (e.g., the total amount of data read during the host system 120 boot process has been transmitted to the host system 120). As such, the processing device determines that the host system 120 is not performing boot process. In some implementations, the total data threshold is a user-configured parameter. In other implementations, the total data threshold is configured by the host system 120 and communicated to the processing device. In yet other implementations, the processing device configures the total data threshold.

If the condition is not satisfied (e.g., the timer is not active, the flag(s) are not set, the total data threshold is satisfied), then the flow of operations moves to operation 415. If the condition is satisfied (e.g., the timer is active, the flag(s) are set, the total data threshold is not satisfied), then the flow of operations moves to operation 425.

At operation 415, the processing device performs a read operation. In some embodiments, the processing device must determine the physical block address before the processing device performs the read operation. For example, the mapping manager 113 obtains a logical to physical representation from memory device 130/140 as described with reference to numeral 3 of FIG. 2. In other embodiments, the processing device performs the read operation using physical block addresses determined when the processing device obtained the logical to physical representation at operation 430, as described below. In general, a read operation involves applying a voltage to a word line powering a transistor (e.g., a memory cell of the memory subsystem). The read operation results in the processing device obtaining data used in the host system 120 boot process.

At operation 420, the processing device transmits the data. In some embodiments, the processing device performs one or more processes before transmitting the data. For example, the processing device can perform any suitable method of error correction. The processing device transmits the data to, for example, the host system 120. After transmitting the data, the processing device may wait for a next received read request (e.g., received at operation 405).

At operation 425, the processing device performs a trace read. As described with reference to numeral 2 of FIG. 2, tracing the read includes assigning a sequence number to the received read request. By assigning sequence numbers to each of the received read requests during a boot process, the processing device captures a sequence (or an order) of the received read requests during the boot process. Tracing the read may also include identifying the logical block address(es) of the read request, region(s)/subregion(s) of the read request, and/or identifying a read length of the read request. For example, the processing device may extract the logical block address and/or the read length from the read request.

At operation 430, the processing device obtains a logical to physical representation. As described with reference to numeral 3 of FIG. 2, the logical to physical representation maps one or more logical block addresses of the received read request to one or more physical addresses.

At operation 435, the processing device creates a record (or an entry) in a boot region table. As described with reference to numeral 4 of FIG. 2, the boot region table can store and tracks sequence numbers, region(s) (e.g., determined by mapping a LBA to a preconfigured region/subregion), and the read length. In some embodiments, the boot region table stores the obtained logical to physical representation of each received read request during a boot phrase.

During a first boot up process, the boot region table is blank. There are no records of read requests received during the host system 120 boot up process because read operations performed during the first boot up have not been traced. Over time, the boot region table is populated with records including sequenced read requests, regions, read lengths, and, in some implementations, logical to physical representations. In some embodiments, such logical to physical representations may include encoded physical block addresses.

Figure 5:
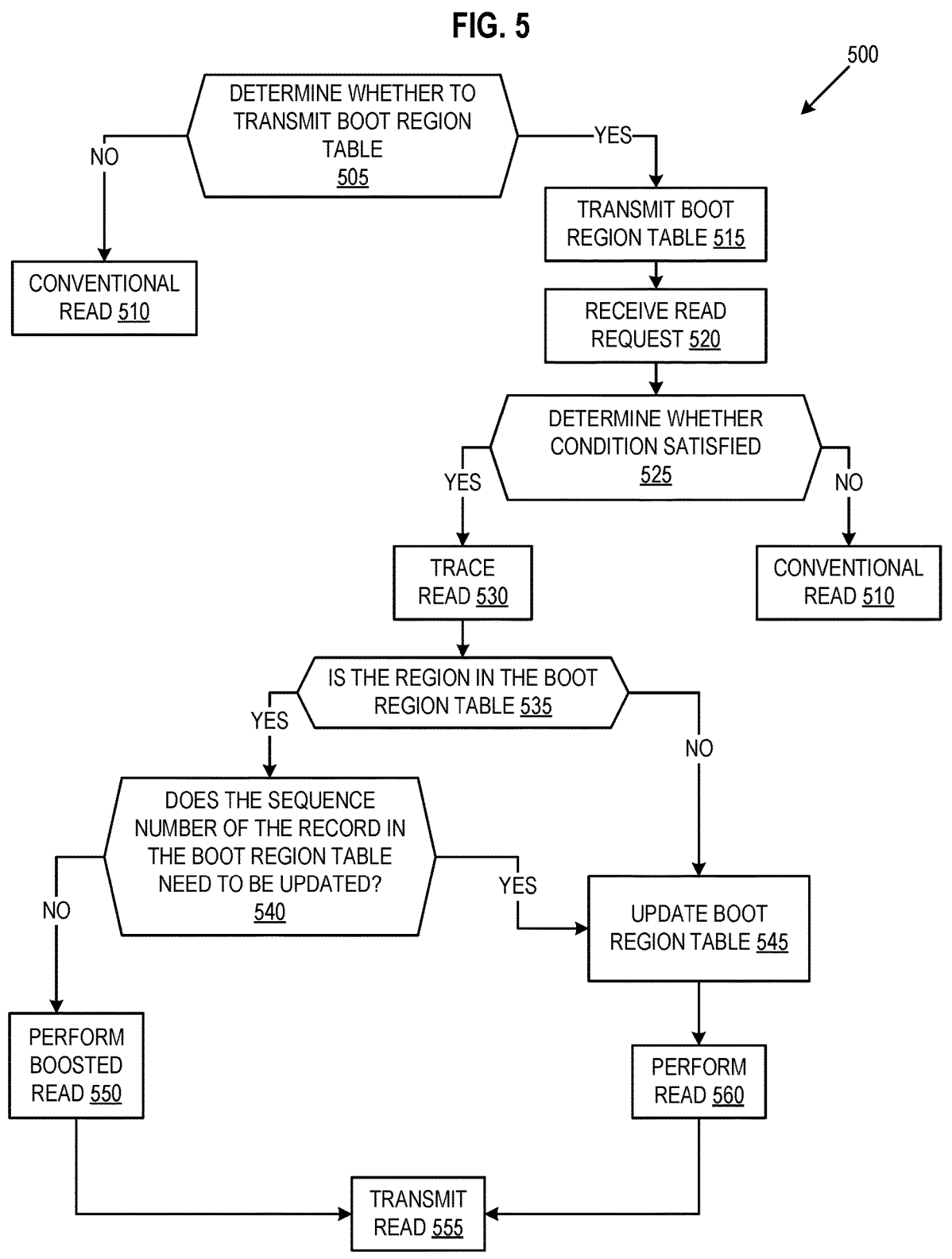
FIG. 5 is a flow diagram of an example method of improving read speed in boot performance using a boot region table, in accordance with some embodiments of the present disclosure.

FIG. 5 is a flow diagram of an example method 500 of improving read speed in boot performance using a boot region table, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the mapping manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device determines whether to transmit the boot region table to the host system. For example, the mapping manager 113 determines to transmit the boot region table responsive to a pre-negotiated and/or preconfigured protocol established between the memory subsystem 110 and the host system 120. If a preconfigured protocol is not established, the mapping manager 113 determines not to communicate the boot region table to the host system 120. In some embodiments, the processing device determines to transmit the boot region table to the host system 120 at the beginning of the host system 120 boot phase. In other embodiments, the processing device determines to transmit the boot region table to the host system 120 responsive to receiving a request or other message from the host system 120.

If the processing device determines not to transmit the boot region table, then the flow of operations moves to operation 510. If the processing device determines to transmit the boot region table, then the flow of operations moves to operation 515.

At operation 510, the processing device performs a conventional read. A conventional read can include multiple read operations. For example, the mapping manager 113 performs a first read operation to obtain a logical to physical mapping of the logical address identified in a read request. To obtain such mapping, the mapping manager 113 queries a lower latency volatile memory of the memory subsystem (such as memory device 140 of FIG. 1) for a L2P table or similar data structure storing a mapping between the physical address and the logical address. Because the lower latency volatile memory is limited in its capacity and only stores a portion of the L2P mappings for the memory subsystem, the mapping manager 113 may have to perform additional memory operations to obtain the logical to physical mapping. When the lower latency volatile memory (such as memory device 140) does not include a logical to physical mapping, the processing device requests a logical to physical mapping from memory device 130. As described with reference to FIG. 1, the memory device 130 may be a higher latency but abundant non-volatile memory that stores a full L2P table of mapped logical addresses and physical addresses. Using the obtained logical to physical mapping, the processing device performs a read operation at the physical address(es) identified in the logical to physical mapping to obtain the requested data. Subsequently, the processing device transmits the data to the host system 120.

At operation 515, the processing device transmits the boot region table to the host system 120 using any suitably mechanism. For example, the mapping manager 113 can transmit the entries of the boot region table to the host system 120 or an address/pointer to a memory location storing the boot region table.

At operation 520, the processing device receives a read request. The received read request may also be referred to as a current read request. Because the processing device transmitted the boot region table (at operation 515), the read request may include a logical to physical representation. For example, the host system 120 previously sent read request(s) to the memory subsystem 110 during prior a boot phase (e.g., the read request received at operation 405 of FIG. 4). Having traced the previous read request(s) and read the respective data of the read request, the mapping manager 113 previously obtained one or more logical to physical representations (e.g., L2P mappings). As described herein, the host system 120 uses the boot region table received in operation 515 to fetch L2P entries according to a start LBA and a read length. As a result, the received read request includes the fetched L2P entries (e.g., the logical to physical representation), the read length, and the LBA.

The read request may also include a region directing the processing device to one or more locations of memory that contains the data to be read, and a length, or a size of the data to be read. In some embodiments, the read request includes one or more logical block addresses. In these embodiments, the processing device can map the one or more logical block addresses to one or more regions (or subregions) based on a preconfigured mapping of the logical block address to the region (or subregion).

Similar to the description above with reference to operation 410 of FIG. 4, the processing device determines whether a condition is satisfied at operation 525. For example, the mapping manager 113 detects if a condition corresponding to a host system 120 boot process is satisfied. If the condition is not satisfied, then the flow of operations moves to operation 510 to execute a conventional read of operation 510 as described above. If the condition is satisfied, then the flow of operations moves to operation 530.

At operation 530, the processing device performs a trace read operation. As described with reference to operation 425 of FIG. 4, tracing the read request includes assigning a sequence number to each received read request. As a result, the order of each received read request is tracked/stored in the boot region table. In some embodiments, tracing can also include identifying a region of the read request and/or identifying a read length of the read request.

At operation 535, the processing device determines whether a region/sub-region determined using the read request (e.g., mapped to the LBA of the read request) received at operation 520 is included in the boot region table. For example, the processing device compares the determined region from the received read request to regions of the boot region table. Specifically, the processing device maps a logical block address to a region and compares the region to regions of the boot region table.

If the processing device determines that the boot region table includes a record of the region matching the region determined from the read request received by memory system, the flow of operations moves to operation 540. If the processing device determines that the region(s) determined from the read request are not stored in the boot region table, the flow of operations moves to operation 545. As described herein, determining that the region obtained using an LBA of the read request and a read length is not in the boot region table means that the read request is a new read request (e.g., a read request not previously received during a boot phase).

At operation 540, the processing device determines whether the assigned sequence number of the read request matches the assigned sequence of the corresponding stored read request in the boot region table. For example, the boot region table includes a region and sequence number and the mapping manager 113 compares the assigned sequence numbers of the read request to the matching entry in the boot sequence table.

In some embodiments, the processing device can perform additional checks at operation 540. For example, as described above, the processing device can compare whether a read length of the read request matches the read length of the corresponding stored read request in the boot region table.

If the compared information (such as the assigned sequence number of the current read request, the read length of the current read request, etc.) matches the corresponding stored information in the boot region table, the boot region table does not need to be updated and the flow of operations proceeds to operation 550. If the compared information does not match the corresponding stored information, the boot region table does need to be updated and the flow of operations proceeds to operation 545.

At operation 545, the processing device updates the boot region table. As described with reference to numeral 11 of FIG. 3, in some embodiments, updating the boot region table includes updating a sequence number. For example, the processing device replaces the sequence number of a stored read request in the boot region table with a sequence number assigned to the read request during the trace read at operation 530 or otherwise changes the order of entries within the boot region table to reflect the updated sequence.

In some embodiments, updating the boot region table includes adding a region to the boot region table. The region is added at a position in the table corresponding to the assigned sequence number. For example, a region assigned to sequence number five is added to the fifth position of the boot region table. Updating the boot region table to include a new region means that the read request is a new read request. As a result, to perform the read request, the processing device obtains the logical to physical representation(s). Such processes are described with reference to operation 430 of FIG. 4. In this manner, the processing device obtains the logical to physical representation such that the processing device can perform a boosted read, as described in operation 550 below.

In yet other embodiments, updating the boot region table includes replacing a read length of a stored read request in the boot region table with the read length received as part of the current read request. In some embodiments, the processing device updates the boot region table by performing some combination of updates.

At operation 550, in response to determining the boot region table does not need to be updated for the current read request, the processing device performs a boosted read. As described with reference to numeral 5 in FIG. 3, a boosted read is a read benefiting from preloaded data, preloaded logical to physical representations, and the like. For example, the processing device may preload physical block addresses corresponding to the region determined using the read request. As a result, the processing device does not have to query a cached L2P table stored in volatile memory and/or a full L2P table stored in non-volatile memory. In this manner, read speed is improved.

At operation 555, the processing device transmits the data to the host system 120.

At operation 560, the processing device performs a read operation. The processing device performs the read operation using physical addresses determined when the processing device updated the boot region table at operation 545. As described herein, the read operation results in the processing device obtaining data used in the host system 120 boot process.

FIG. 6 is a flow diagram of another example method 600 to improve read speed during a boot up process using a dynamic boot region table, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the mapping manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device receives a first read request during a first boot time, wherein the first read request includes a logical block address and a length. The read request identifies data to be read from a portion of memory. The length indicates a size of the data to be read. In some embodiments, the processing device maps the logical block address to a region/subregion, where the region/subregion is a range of logical block addresses.

At operation 610, the processing device traces the first read request. As described with reference to operation 425, tracing the read request includes assigning a sequence number to the received read requests. In some embodiments, tracing can also include identifying the logical block address(es) of the received read request and/or identifying read lengths.

At operation 615, the processing device creates a table using the first traced read request, wherein the table includes a sequential record of each traced read request received during the first boot time. As described with reference to operation 435, the table is a sequential record of read requests during a boot phase including one or more regions and a read length. In some embodiments, the boot region table includes logical to physical representation(s) (e.g., obtained physical addresses mapped to the range of logical addresses of the region). Each entry in the boot region table is a record tracking the sequence of read requests during the boot phase. The logical to physical representation maps regions determined from the logical block address(es) received as part of the read request to physical addresses or encoded physical addresses. Such logical to physical mapping is obtained by querying a memory device (such as memory device 130 and/or memory device 140).

As described with reference to operation 515, at operation 620, the processing device transmits the table to a host system during a second boot time.

At operation 625, the processing device receives a second read request during the second boot time, wherein the second read request includes a logical to physical representation obtained using the table and the logical block address. As described with reference to operation 520, because the processing device transmitted the table, the logical to physical representation corresponding to the LBA/region of a read request during a subsequent boot time may be preloaded by the processing device if the read request was also received during a first (or previous) boot time.

Figure 7:
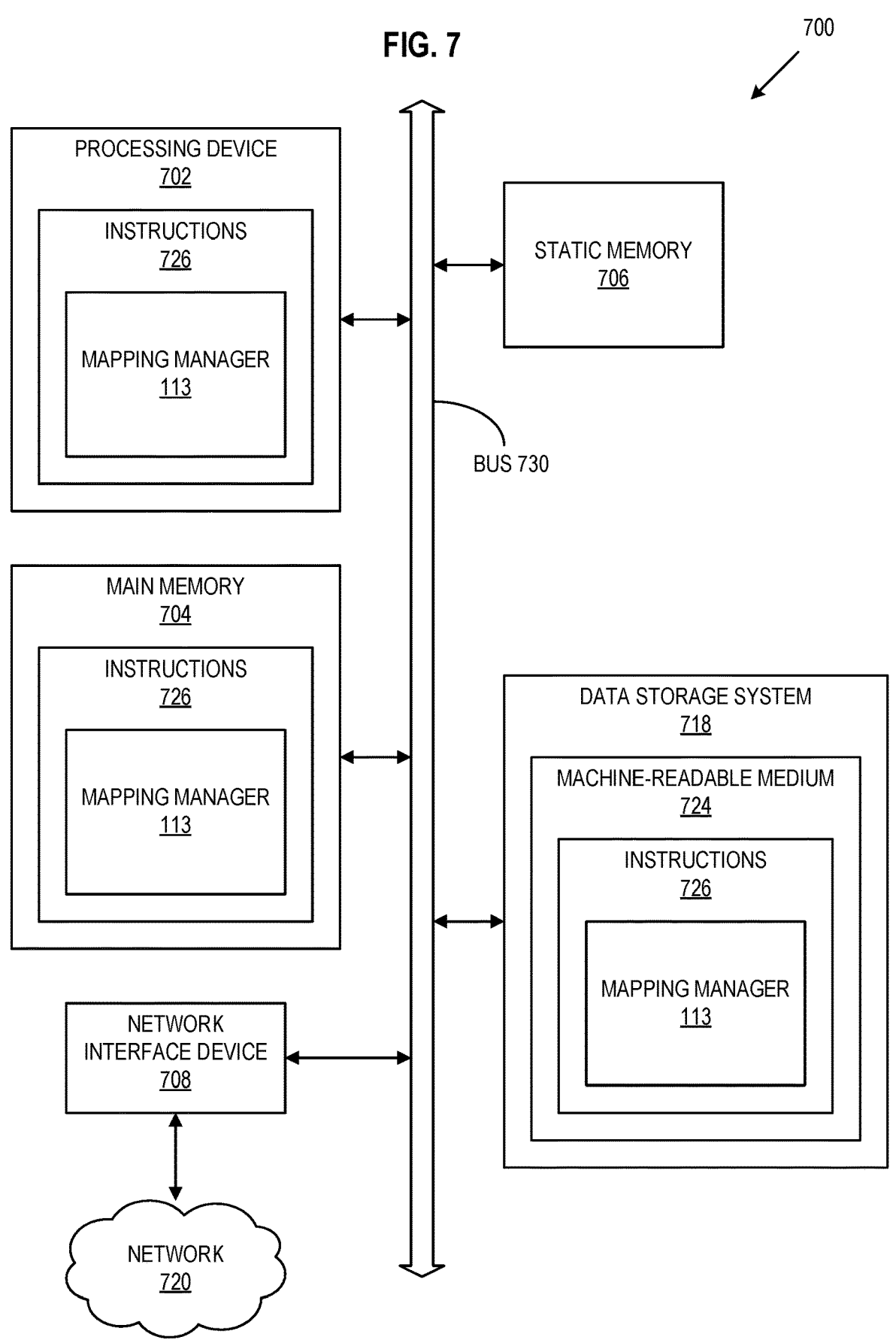
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the mapping manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a mapping manager (e.g., the mapping manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bis, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the mapping manager 113 may carry out the computer-implemented methods 400, 500, and/or 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving, by a memory system from a host system, a first read request during a first boot time, wherein the first read request includes a logical block address and a length;

tracing, by the memory system, the first read request;

creating, by the memory system, a table using the traced first read request received during the first boot time, wherein the table includes a sequential record of each traced read request received during the first boot time;

transmitting, by the memory system to the host system, the table during a second boot time; and receiving, by the memory system from the host system, a second read request during the second boot time, wherein the second read request includes a logical to physical representation obtained using the table and the logical block address.

2. The method of claim 1, further comprising:

mapping the logical block address to a region including the logical block address, wherein the region is a range of logical block addresses; and storing the region and the traced first read request in the table.

3. The method of claim 1, further comprising:

obtaining the logical to physical representation of the first read request by querying a memory device for a physical address corresponding to the logical block address of the first read request.

4. The method of claim 1, wherein tracing the first read request further comprises:

assigning a sequence number to the first read request; and storing the first read request in order of the assigned sequence number in the table.

5. The method of claim 4, further comprising:

during the second boot time, tracing the second read request, wherein tracing the second read request includes assigning a sequence number to the second read request;

comparing the sequence number of the second read request to the sequence number of the first read request stored in the table; and determining to update the sequence number of the first read request in the table responsive to the sequence number of the second read request not matching the sequence number of the first read request.

6. The method of claim 1, further comprising:

receiving a third read request during the second boot time, wherein the third read request includes a second logical block address and a second length;

mapping the second logical block address to a second region;

tracing the third read request;

determining that the table does not include a record including the second region;

obtaining a logical to physical representation of the second region by querying a memory device for a physical address corresponding to the second logical block address; and adding a record to the table for the traced third read request including the second region, a sequence number assigned to the third read request, and the second length.

7. The method of claim 1, further comprising:

receiving a third read request during the second boot time;

determining that a timer is active; and responsive to determining that the timer is active, tracing the third read request.

8. A non-transitory computer-readable storage medium comprising instructions that, when executed by a processing device, cause the processing device to:

receive, by a memory system from a host system, a first read request during a first boot time, wherein the first read request includes a logical block address and a length;

trace, by the memory system, the first read request;

create, by the memory system, a table using the traced first read request received during the first boot time, wherein the table includes a sequential record of each traced read request received during the first boot time;

transmit, by the memory system to the host system, the table to a host system during a second boot time; and receive, by the memory system from the host system, a second read request during the second boot time, wherein the second read request includes a logical to physical representation obtained using the table and the logical block address.

9. The non-transitory computer-readable storage medium of claim 8, wherein the processing device is further to:

map the logical block address to a region including the logical block address, wherein the region is a range of logical block addresses; and store the region and the traced first read request in the table.

10. The non-transitory computer-readable storage medium of claim 8, wherein the processing device is further to:

obtain the logical to physical representation of the first read request by querying a memory device for a physical address corresponding to the logical block address of the first read request.

11. The non-transitory computer-readable storage medium of claim 8, wherein tracing the first read request further causes the processing device to:

assign a sequence number to the first read request; and store the first read request in order of the assigned sequence number in the table.

12. The non-transitory computer-readable storage medium of claim 11, wherein the processing device is further to:

during the second boot time, trace the second read request, wherein tracing the second read request includes assigning a sequence number to the second read request;

compare the sequence number of the second read request to the sequence number of the first read request stored in the table; and determine to update the sequence number of the first read request in the table responsive to the sequence number of the second read request not matching the sequence number of the first read request.

13. The non-transitory computer-readable storage medium of claim 8, wherein the processing device is further to:

receive a third read request during the second boot time, wherein the third read request includes a second logical block address and a second length;

map the second logical block address to a second region;

trace the third read request;

determine that the table does not include a record including the second region;

obtain a logical to physical representation of the second region by querying a memory device for a physical address corresponding to the second logical block address; and add a record to the table for the traced third read request including the second region, a sequence number assigned to the third read request, and the second length.

14. The non-transitory computer-readable storage medium of claim 8, wherein the processing device is further to:

receive a third read request during the second boot time;

determine that a timer is active; and responsive to determining that the timer is active, trace the third read request.

15. A system comprising:

a plurality of memory devices; and a processing device, operatively coupled with the plurality of memory devices, to:

receive, by a memory system from a host system, a first read request during a first boot time, wherein the first read request includes a logical block address and a length;

trace, by the memory system, the first read request;

assign, by the memory system, a sequence number to the first read request;

create, by the memory system, a table using the traced first read request received during the first boot time, wherein the table includes the first read request in order of the assigned sequence number;

transmit, by the memory system to the host system, the table during a second boot time; and receive, by the memory system from the host system, a second read request during the second boot time, wherein the second read request includes a logical to physical representation obtained using the table and the logical block address.

16. The system of claim 15, wherein the processing device is further to:

map the logical block address to a region including the logical block address, wherein the region is a range of logical block addresses; and store the region and the traced first read request in the table.

17. The system of claim 15, wherein the processing device is further to:

obtain the logical to physical representation of the first read request by querying a memory device for a physical address corresponding to the logical block address of the first read request.

18. The system of claim 17, wherein the processing device is further to:

during the second boot time, trace the second read request, wherein tracing the second read request includes assigning a sequence number to the second read request;

compare the sequence number of the second read request to the sequence number of the first read request stored in the table; and determine to update the sequence number of the first read request in the table responsive to the sequence number of the second read request not matching the sequence number of the first read request.

19. The system of claim 15, wherein the processing device is further to:

receive a third read request during the second boot time, wherein the third read request includes a second logical block address and a second length;

map the second logical block address to a second region;

trace the third read request;

determine that the table does not include a record including the second region;

obtain a logical to physical representation of the second region by querying a memory device for a physical address corresponding to the second logical block address; and add a record to the table for the traced third read request including the second region, a sequence number assigned to the third read request, and the second length.

20. The system of claim 15, wherein the processing device is further to:

receive a third read request during the second boot time;

determine that a timer is active; and responsive to determining that the timer is active, trace the third read request.

\* \* \* \* \*